(12) United States Patent
Klettke (10) Patent No.: US 9,567,799 B2
(45) Date of Patent: Feb. 14, 2017

(54) WINDOW SHADE AND WINDOW ELEMENT

(71) Applicant: Airbus Operations GmbH, Hamburg (DE)

(72) Inventor: Marcus Klettke, Bremen (DE)

(73) Assignee: AIRBUS OPERATIONS GMBH, Habmurg (DE)

( * ) Notice: Subject to any disclaimer, the term of this patent is extended or adjusted under 35 U.S.C. 154(b) by 0 days.

(21) Appl. No.: 14/303,668

(22) Filed: Jun. 13, 2014

(65) Prior Publication Data

US 2014/0376072 A1    Dec. 25, 2014

(30) Foreign Application Priority Data

Jun. 20, 2013 (EP) ..................... 13173019

(51) Int. Cl.

| | | |
|---|---|---|
| *G02B 26/00* | (2006.01) | |
| *E06B 9/24* | (2006.01) | |
| *G02F 1/01* | (2006.01) | |
| *G02B 26/02* | (2006.01) | |
| *B64C 1/14* | (2006.01) | |

(52) U.S. Cl.
CPC ............. *E06B 9/24* (2013.01); *B64C 1/1484* (2013.01); *B64C 1/1492* (2013.01); *G02B 26/02* (2013.01); *G02F 1/01* (2013.01); *E06B 2009/2405* (2013.01)

(58) Field of Classification Search
CPC ............................................. E06B 2009/2464
USPC ............................................................ 359/275
See application file for complete search history.

(56) References Cited

U.S. PATENT DOCUMENTS

| | | | | |
|---|---|---|---|---|
| 7,690,414 B2* | 4/2010 | Knowles | ................ | B60J 1/2025 |
| | | | | 160/168.1 P |
| 8,220,521 B2* | 7/2012 | Tischer | ................. | B64C 1/1484 |
| | | | | 160/310 |
| 2004/0262453 A1* | 12/2004 | Sanz | .................... | B60J 1/2041 |
| | | | | 244/129.3 |
| 2005/0200937 A1 | 9/2005 | Weidner | | |
| 2008/0230653 A1 | 9/2008 | Mitchell et al. | | |
| 2009/0241424 A1 | 10/2009 | Mohat et al. | | |

OTHER PUBLICATIONS

European Patent Office, European Search Report for European Application No. 13173019.4 mailed Nov. 15, 2013.

* cited by examiner

*Primary Examiner* — James Jones
(74) *Attorney, Agent, or Firm* — Lorenz & Kopf, LLP.

(57) ABSTRACT

A window element having a window shade is provided. The window element has a viewing area, comprising a window shade element. The window shade element includes an electrically darkable element, and the window shade element is movable between a first position and a second position. In the first position, the window shade element is covering a first portion of the viewing area, and in the second position, the window shade element is covering a second portion of the viewing area. The first portion and the second portion are unequal.

20 Claims, 4 Drawing Sheets

WINDOW SHADE AND WINDOW ELEMENT

CROSS-REFERENCE TO RELATED APPLICATION

This application claims priority to European Patent Application No. 13 173 019.4, filed Jun. 20, 2013, which is incorporated herein by reference in its entirety.

TECHNICAL HELD

The technical field relates to window technology. In particular, the technical field relates to aircraft window technology for an aircraft fuselage. More particularly, the technical field relates to a window element, a window system and a vehicle, in particular in aircraft, having a window shade.

BACKGROUND

Known window elements, in particular for aircraft applications, regularly comprise a transparent pressure proof window pane through which a passenger seated adjacent to the window may look through the same to get information about the surroundings of the aircraft. Regularly, such a window further comprises a window shade, embodied as a manually operated shade element, e.g. a plastic pull down/push up shade. In other words, the passenger is required to manually darken the window by pulling it down or remove the shade by pushing it up. In certain situations, e.g. emergency situations or while takeoff and landing, regulations require the window shades to be fully opened. During the flight however, the passenger may choose whether he/she wants to have an open window or whether to close the shade.

Figure 1:
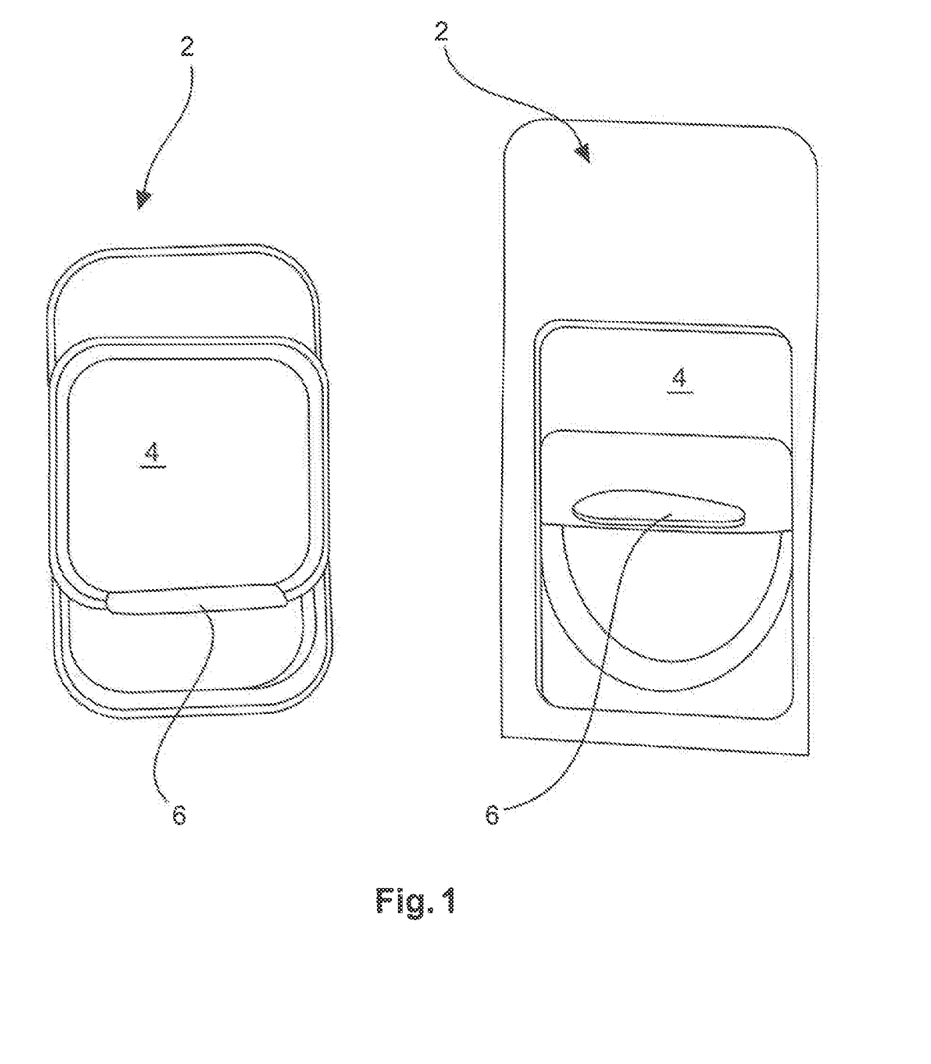
FIG. 1 shows two exemplary embodiments of aircraft windows.

FIG. 1 shows two exemplary embodiments of aircraft windows. Each aircraft window 2 comprises a viewing area, i.e. an area where the passenger may look through to obtain information from the outside of the aircraft. The viewing area may be covered by a shade element 4, and comprises a handle 6 for manually moving up and down the shade element 4. In case the shade element 4 is moved completely downward, the window element/viewing area is darkened while when the shade element 4 is moved completely upwards, the viewing area is substantially free.

Establishing that all shades are open may be a cumbersome task for aircraft personnel during takeoff and landing while manually moving a plastic shade may lack a certain degree of convenience for the passenger.

In addition, other objects, desirable features and characteristics will become apparent from the subsequent summary and detailed description, and the appended claims, taken in conjunction with the accompanying drawings and this background.

SUMMARY

One of various aspects of the present disclosure may be seen in providing a novel window shade, a window element with such a window shade as well as a window system.

One of various aspects of the present disclosure is to replace the previously known manual pull down shade by a window shade element, that is an at least partially electrically darkable element. The window shade element may be moved at least between a first position and a second position, with the window shade element covering a first portion of the viewing area in the first position and a second portion of the viewing area in a second position. The first and second positions or the first and second portions are unequal.

According to one embodiment of the present disclosure, a window system having at least one window element according to the present disclosure is provided, wherein the window shade element is manually movable between the first position and the second position and wherein the window shade element and/or the electrically darkable element is controllable by a locally provided control element and also remotely controllable, in one example, centrally controllable.

According to one embodiment of the present disclosure, a vehicle, for example, an aircraft comprising at least one of the window system and the window element according to the present disclosure is provided.

The window shade element of the present disclosure may be comparable to the formally known manually movable plastic window shade in that it may be moved up and down to be either in front of the viewing area of the window element or at least partially removed from the viewing area of the window element. The window shade element may either be itself an electrically darkable element or it may be at least (partially) comprise an electrically darkable element. By using the electrically darkable element, the viewing area of the window element may be embodied at least having two different viewing modes, one viewing mode in which the electrically darkable element is substantially transparent or at least translucent, while in a further viewing mode the electrically darkable element is substantially non-transparent or darkened. Accordingly, the shade functionality in that the viewing area may be either presented to the passenger inside the aircraft or may be darkened so that the passenger may not see through the viewing area/window to the outside of the aircraft may be provided by either operating the electrically darkable element to be in a transparent or a non-transparent mode or by manually moving the window shade element. The electrically darkable element may be embodied as an element, which only requires energy when switching its state, i.e. when switching between transparent and non-transparent or when assuming a different level of translucency or opacity. Such an operation may be comparable to e.g. e-ink display of an e-book reader, which also requires energy only when switching pages but not when maintaining a certain depiction of a page.

According to one embodiment of the present disclosure, the window shade element itself may still be provided with the functionality of manually moving the shade element, so that it may be possible to remove the electrically darkable element itself from the viewing area, e.g. by moving the shade element upwards so that it resides in the fuselage of the aircraft and thus the passenger is having an unobstructed view of the viewing area through the pressure proof window pane of an aircraft window. Thus, the first position of the window shade element may thus be seen as the position in which it is substantially fully covering the viewing area while the second position may be considered to be the position in which the window shade element is substantially completely removed from the viewing area. As with previously known plastic shade elements, the window shade element may take up any arbitrary position between the first position and the second position, i.e. any position the window shade element may be moved to manually by pulling down or pushing up the shade element. In other words, the window element may be darkened by arranging the window shade element in the viewing area, while electrically darking the electrically darkable element. A non-darkened mode of the window element may be provided by either manually removing the window shade element and/or by operating the electrically darkable element in a transparent, non-darkened mode.

According to one embodiment of the present disclosure, the window shade element and/or the electrically darkable element may be embodied as a darkable glass, e.g. by employing micro-mirror arrays, an electrochromic element, a suspended particle device or a similar technology, in particular a technology that may switch between a darkened and a non-darkened state in a fast manner, in particular substantially instantaneously.

According to one embodiment of the present disclosure, the window shade element may be further provided with a photoelectric element, in particular a photovoltaic element, adapted to generate energy which can be employed for at least partially operating the electrically darkable element and/or the window shade element. In one example, the generated energy is employed for operating the electrically darkable element so that no further energy is required for its operation. In other words, the window element may be seen as being energy self-sufficient in that energy required for operation of the window element is generated by the photoelectric element of the same window element. The photoelectric element may be provided separately at the window element or it may be provided such that the electrically darkable element and the photoelectric element together constitute the window shade element. E.g., the photoelectric element may be a transparent or translucent element attached to an area of the electrically darkable element, thereby providing energy without influencing the ability to employ the electrically darkable element in one of a darkened and a transparent mode. The photoelectric element may partially be arranged in the viewing area, thus be only partially arranged on the window shade element and/or the electrically darkable element, while the photoelectric element may not be completely transparent, so long as at least some transparency remains so that a passenger may look through the window element, i.e. through the electrically darkable element, in an undarkened state, and the photoelectric element, and still sees the outside surroundings of the aircraft, it may be sufficient for the window element for providing its window functionality.

According to one embodiment of the present disclosure, a control element may be provided, arranged in the vicinity of the window element, i.e. arranged locally for operation by e.g. a passenger seated next to the window in a specific row in an aircraft. The control element may be incorporated in a specific seat, may be incorporated in more than one seat per row, e.g. all seats in a specific row associated with a respective window element or may be arranged at the window element itself, in the rim area or cover area of the aircraft fuselage. The control element may even be incorporated into/provided on the window shade element itself so that a user or passenger may control the electrically darkable element, in particular the opacity or transparency/translucency of the electrically darkable element. In other words, the control element may provide a switching functionality between either (completely) transparent and (completely) non-transparent, may provide specific levels of transparency in between or may even provide a substantially continuous controlling of transparency of the electrical darkable element by e.g. a slider functionality. The control element may thus control the electrically darkable element to be either transparent, non-transparent or to a certain degree translucent between transparent and non-transparent. The control element may e.g. be a capacitive control element or a comparable touch capable control element, which is affixed to the surface of the window shade element and/or the electrically darkable element. Thereby, a user of the window element may employ the control element attached to the window element itself, in particular to the window shade element or the electrically darkable element, e.g. by sliding a finger or the like on a specific surface of the control element, for setting a desired state of the electrically darkable element between and including completely transparent and completely non-transparent.

According to one embodiment of the present disclosure, the window element further comprises an energy storage element for storing energy for operating the electrically darkable element, in particular together with the control element, especially in a case when insufficient energy may be generated by the photoelectric element to cover a certain current need of the electrically darkable element. The energy storage element may be a capacitive element, e.g. a capacitor arranged in the vicinity of the window element, in particular attached to the window shade element or the electrically darkable element. Also, the window shade element and/or the electrically darkable element may comprise the energy storage element. Thus, a discrete energy storage element may be provided or the window shade element and/or the electrically darkable element may comprise a further (functional) layer providing the energy storage capability. In the latter case, providing the energy storage element to be also transparent or at least translucent may be preferable. Also the photoelectric element may be provided as an additional layer of/on the window shade element and/or the electrically darkable element.

According to one embodiment of the present disclosure, the light employed for generating energy by the photoelectric element may be received from a first side and/or from a second side of the window element. The first side may e.g. be the interior side of the aircraft cabin while the second side may be the outside of the aircraft, thereby receiving light through the viewing area/the window pane. In case the electrically darkable element is not fully non-transparent, light may be received from either side, while, in case the electrically darkable element is substantially completely darkened, light may only be received from the side opposite of the electrically darkable element. Also, a photoelectric element may be arranged at both sides, e.g by providing two layers, of the electrically darkable element and thus may receive light from the first side and from the second side independently.

According to one embodiment of the present disclosure, the window shade element may be movable between the first position and the second position by a manual operation, in one example, directly engaging the window shade element and/or may be movable by an actuator element engaging the window shade element. In other words, the window shade element may e.g. be provided with a handle and may be operated as a previously known (plastic) window shade in that it may be moved up and down by a passenger or aircraft personnel. Thus, even in an emergency situation or in case of a malfunction of the window element, the window element, in particular in its darkened state, may be removed by manually moving the window shade element. Further, an actuator element may be arranged in the vicinity of a particular window element, which may move the window shade element, e.g. electrically or pneumatically. Energy for the actuator element may be provided by the energy storage element or externally from a further energy source, e.g. within the aircraft. Also, by the actuator element, the window shade element may be operated remotely, e.g. centrally from within the aircraft cabin, e.g. by aircraft personnel. In other words, either the electrically controllable element and/or the window shade element may be operated remotely, in one example, centrally from within the aircraft cabin. For example, in case of an emergency, a flight attendant could set ail electrically darkable elements of a specific aircraft to a non-darkened state and/or may remotely operate the actuator element to remove the window shade element from the viewing area by moving the window shade element by the actuator element. In case the energy storage element provides sufficient energy for operating either the electrically darkable element and/or the actuator element, only a control connection to a specific window element may be required. In case also energy is to be provided to the window element, said energy could be provided via the same control connection or via a further, separate dedicated energy connection.

According to one embodiment of the present disclosure, the electrically darkable element may be adapted to be selectively darkable, in one example, so that visual information may be visualized or presented on the electrically darkable element, e.g. to passengers of the aircraft seated adjacent to the window element in a specific seat row. By employing a certain technology for the electrically darkable element, it may e.g. comprise a specific pixel structure for providing the darkening. However, such a pixel structure may also be controlled such that individual pixels are darkened or non-darkened thereby allowing the presentation of text, pictures or other kinds of information, thereby enhancing the flight experience of the passengers. Also, information may be depicted by controlling the electrically darkable element such that information depicted is depicted by slightly reducing the non-transparency of certain pixels of the electrically darkable element, thereby e.g. employing the outside light surrounding the aircraft as a form of background illumination. Thus, it may not be required to steer certain areas or pixels of the electrically darkable element to be completely transparent but it may be sufficient to only partly reduce non-transparency. Thus, highlighted information, illuminated by light outside of the cabin, could be presented vs. a substantial darkened, non-transparent background.

According to one embodiment of the present disclosure, the window element further comprises a guiding element for accommodating the window shade element and for guiding the window shade element when being moved. In one example, a dedicated rail system or the like, comparable to a guiding element used for guiding a known window shade, may be employed. Subsequently, it may be preferred that the window element is embodied as an integral element comprising the electrically darkable element and at least one of the photoelectric element, the control element and the energy storage element. E.g., the window shade element may be provided as a shade shaped structure having a suitable width and length while featuring a comparably small thickness, with the electrically darkable element, the photoelectric element, the control element and/or the energy storage clement being embodied as individual layers of a suitable material attached to one another. E.g., the electrically darkable element and the photoelectric element may be attached to one another, e.g. glued to one another, while the energy storage element is provided by an energy storing functionality between the electrically darkable element and the photoelectric element, e.g. using a capacitive effect, thereby being capable of storing energy, while the control element, e.g. embodied as a (capacitive) touch control element is also attached to the electrically darkable element or the photoelectric element and provides its functionality through a surface contact area directly to the electronic structure of the electrically darkable element, the photoelectric element and/or in particular the energy storage element.

According to one embodiment of the present disclosure, the window clement further comprises a sensor element for detecting a fight level, in particular an ambient light level within the aircraft cabin and/or an exterior light level, external of the aircraft. The information obtained by the sensor element may thus be employed for controlling, in particular automatically controlling, the electrically darkable element. For example, in case a high level of light is outside of the cabin, e.g. when flying in sunlight or over a desert, the electrically darkable element could be darkened to a certain degree, to hinder a specific percentage of external light entering the cabin. Also, the operation or mode of the electrically darkable element could be controlled by a specific difference of light within and outside of the cabin. For example, in case of a completely darkened cabin during a night flight, it may not be required that the electrically darkable element is darkened. Also, e.g. at the end of the night, while the aircraft cabin still is substantially light-free or at least has a reduced light level, the electrically darkable element could be progressively darkened while the outside light level is rising, e.g. during sunrise. The same functionality may be provided, in reverse, during sunset.

According to one embodiment of the present disclosure, the window element may be embodied as an aircraft window element, in particular a window element for the passenger cabin.

According to one embodiment of the present disclosure, a window system with at least one window element according to the present disclosure is provided, whereby the window shade element is manually movable between the first position and the second position, wherein the window shade element and/or the electrically darkable element is controllable by a locally provided control element and wherein the window shade element and/or the electrically darkable element is remotely controllable, in one example, centrally controllable, e.g. from within the aircraft cabin by a flight attendant.

According to one embodiment of the present disclosure, a vehicle, in particular an aircraft, comprising one of a window system and/or a window element according to the present disclosure is provided.

Thus, the window element and in particular the window shade element may be embodied using a dust cover comparable to a previously known manual pull down shade, however constituting of the electrically darkable element, a photoelectric element or solar cell together with capacitive sensing. Such an embodiment would allow to reduce weight, would be dimmable with low maintenance requirements and in particular without wires, brackets and external power supply, in particular in case the window element comprises the energy storage element as well as a locally arranged control element, e.g. a switch or a touch control element in the window element itself. Such a system results in single item robustness. Sunlight from outside the cabin or light from within the cabin may thus provide the energy required for darkening or coloring, thereby removing the need for a dedicated power supply. The window element may feature external dimensions comparable to a common window element. Thus, the window element according to the present disclosure may be incorporated into existing aircraft cabin structures without redesign, while providing the same or comparable structural support as a common window element, since in particular only the shade itself of a previously known window is substituted by the window shade element of the present disclosure. Also, the window element of the present disclosure ma be the window shade element.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 2:
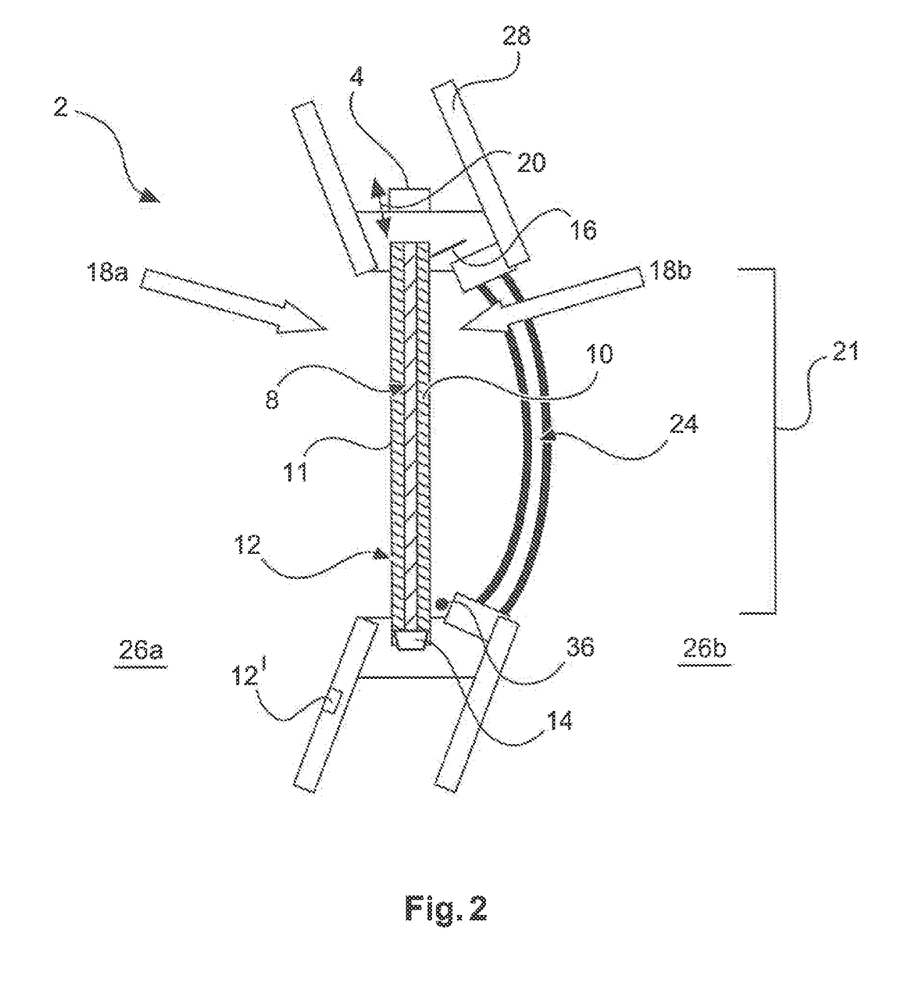
FIG. 2 shows a cross-sectional view of an exemplary embodiment of the window element according to the present disclosure.

Now referring to FIG. 2, an exemplary embodiment of the window element according to the present disclosure is depicted.

FIG. 2 shows a cross-sectional view of an aircraft fuselage with a window element. Window element 2 is situated in fuselage 28 with the inside of the aircraft 26a depicted on the left side and the outside of the aircraft 26b depicted on the right side of fuselage 28 and window element 2. An outer window pane 24 is arranged at the window element 2. It is also conceivable, that window element 2 and outer window pane 24 constitute an integral element that can be inserted into fuselage 28 and which also provides structural support for the aircraft/fuselage 28. Window element 2 comprises window shade element 4. Window shade element 4 is exemplarily embodied comprising a layered structure with an electrically darkable element 8, a photoelectric element 10, a control element 12 as well as a cover element 11, e.g. a dust cover. Dust cover 11 however is not mandatory but may be provided to protect the window shade element 4 e.g. when a passenger rests against the window. An energy storage element 14 is provided, exemplarily incorporated into the window shade element 4 at its bottom as a separate element, e.g. a capacitive element. However, an additional layer, comparable to layers 11, 8 and 10, may be provided to provide the functionality of an energy storage element 14. Control element 12 is only arranged at a specific location on the window shade element 4, however my also be provided, alternatively, or additionally, in the fuselage section adjacent to the window element 2, as depicted by element 12'. Exemplarily, control connection 16 is provided, which however is not mandatory, in particular in case the window element 2 is a standalone, self-sufficient window element as previously described, for controlling e.g. the electrically darkable element 8 and possibly a further actuator, not depicted in FIG. 2, for moving the window shade element 4, e.g. with regard to FIG. 2 to the upper part of fuselage 28. Elements required for allowing the moving of the window shade element 4 are not depicted in FIG. 2. It is also conceivable to provide window element 2 with a non-movable window shade element, which then however does not provide the emergency functionality of removing the window shade element manually. However, further applications are conceivable, where the emergency functionality may not be required. In case the window shade element 4 is not movable, the window shade element may comprise at least the elements of the electrically darkable element, the photoelectric element and possibly one of the dust cover element 11, the control element 12 and the energy storage element 14. A control connection 16 can also be provided to a non-movable window shade element 4.

Photoelectric element 10, e.g. a solar cell, is provided, which may receive light 18, either from inside the cabin 18a or from outside the cabin 18b through the viewing area 21. All elements of the window shade element 4 are generally transparent or at least translucent so that light from outside of the cabin 18b may penetrate and enter the aircraft, while a passenger situated on the inside 26a of the cabin may grasp the surroundings 26b of the aircraft through viewing area 21. Since the electrically darkable element 8 may be darkened, light 18b could be prevented from entering the cabin, while a passenger seated inside the cabin could be hindered from seeing to the outside 26b of the aircraft.

Sensor 36 is provided to Obtain information about a specific current light situation at the window element. Sensor 36 may be embodied such that it may differentiate between the light 18a coming from within the cabin 26a and the light 18b coming from outside of the cabin 26b and could thus automatically steer the electrically darkable element 8 according to the current light condition.

Figure 3:
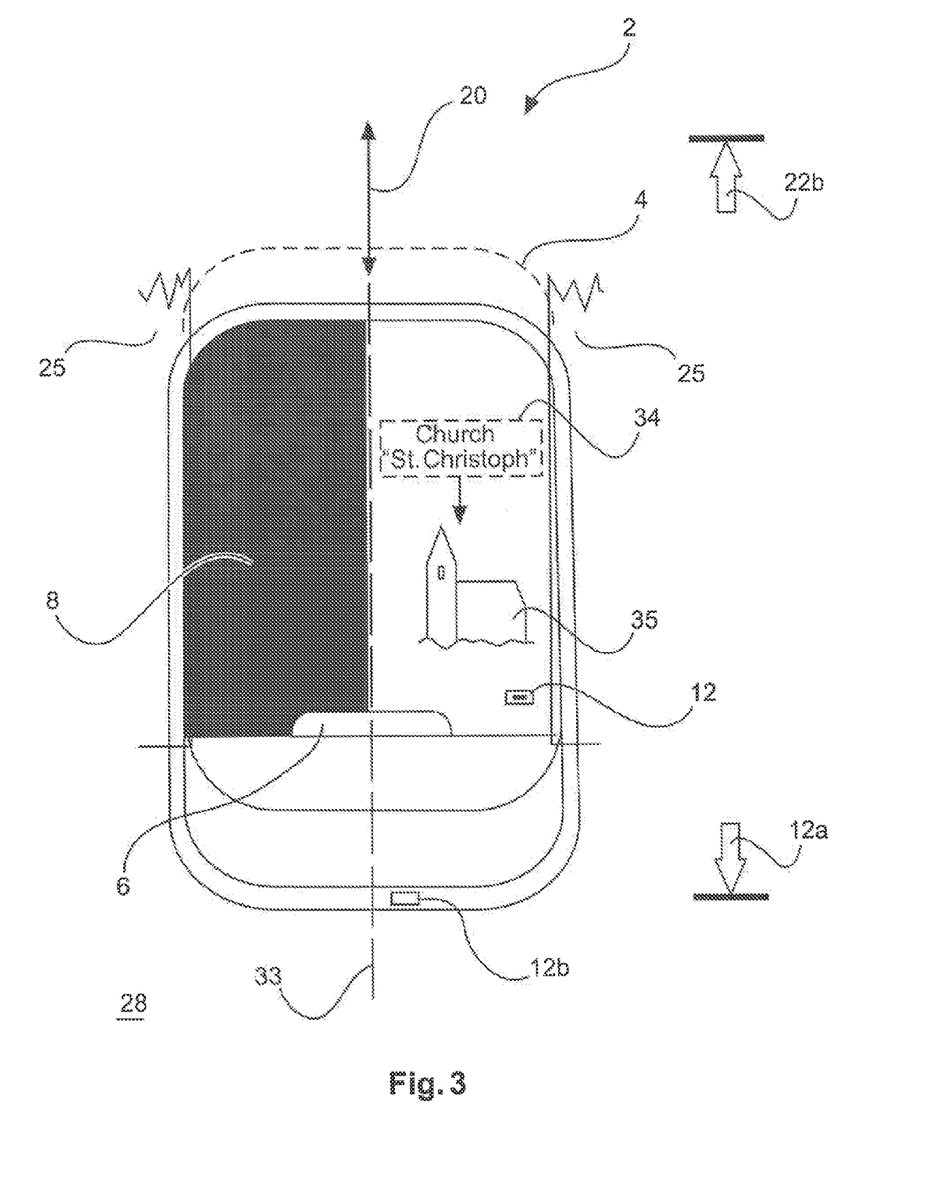
FIG. 3 shows an exemplary embodiment of a window element according to the present disclosure in operation.

Now referring to FIG. 3, an exemplary embodiment of a window element according to the present disclosure in operation is depicted.

FIG. 3 is an exemplary depiction of a window element according to the present disclosure seen by a passenger sitting adjacent to the window element. On the left side of axis 33, the window shade element 4 is almost fully closed while the electrically darkable element 8 is in its darkened state. Thus, a passenger may not look to the outside 26b of the aircraft. On the right side of axis 33, a substantially transparent or at least translucent electrically darkable element 8 is depicted so that a passenger may look to the outside 26b of the aircraft. Exemplarily, a building 35, a church, is depicted in FIG. 3. Thus, the passenger may look through the window shade element 4 and see the surroundings of the aircraft, thereby seeing the church. Information 34 is provided by the electrically darkable element 8 in the form of text and explains that the church 35 is called "St. Christopher". Additional information 34 about the church or the surroundings in general could be provided by the electrically darkable element 8.

Window shade element 4 is movable 20, in FIG. 3 exemplarily upwards and downwards e.g. by a passenger employing handle 6. A control element 12a is provided on the surface of the window shade element 4, e.g. a capacitive or touch-sensitive control element, while a further control element 12b is depicted at a position, which is locally in the vicinity of window element 2, however arranged at the aircraft fuselage 28. In FIG. 3, the first position, i.e. the fully closed position of the window shade element 4 is depicted by arrow 22a while the fully opened position or second position is depicted by arrow 22b. Regardless of a specific position 22a, 22b or any position in between said two positions, the window element may be darkened by using the electrically darkable element S. In case the window shade element 4 is in the second position 22b, then the viewing area 21 and thus the outside 26b of the cabin is always visible from within the aircraft cabin 26a, thus allowing to quickly remove any shading of window element 2, e.g. in an emergency situation or in case of a malfunction.

Figure 4:
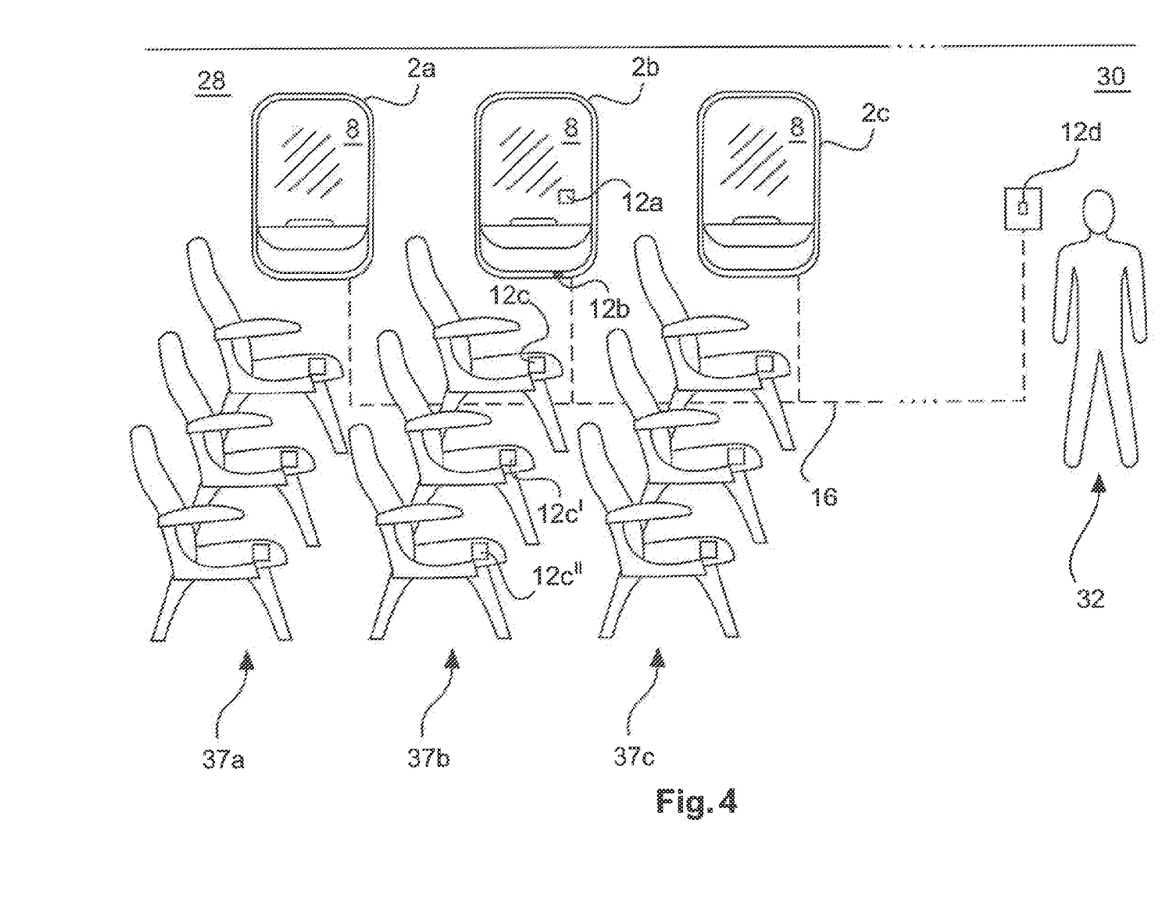
FIG. 4 shows an exemplary embodiment of a window system according to the present disclosure.

Now referring to FIG. 4, an exemplary embodiment of a window system according to the present disclosure is depicted.

FIG. 4 shows a window system exemplarily comprising three rind& elements 2a,b,c according to the present disclosure. Each window element 2a,b,c is arranged adjacent to a seat row 37a, 37b, 37c. Exemplarily only depicted with regard to seat row 37b, apart from the functionality of window clement 2 as described with regard to either FIG. 2 and/or FIG. 3, a control element 12c is provided at the seat, e.g. incorporated into the arm rest of the aircraft seat. However, not only the passenger sitting next to the window element 2 may be provided with control element 12c, but also one, more or all further seats of a specific seat row 37 may be provided with a control element 12c', 2c'' for controlling window element 2, in one example, the electrically darkable element 8 of said window element 2.

Window element 2 in FIG. 4 however is not only locally controllable by either control element 12, 12a, 12b or 12c but may also be controlled by a remotely arranged control element 12d via control connection 16. An operator or flight attendant 32 may employ remote control element 12d, in one example, as a centrally arranged control element for operating all window elements 2/electrically darkable elements 8 at the same time. Control connection 16 could also provide energy to window elements 2 in case a window element 2 has no local energy storage element 14 or in case said local energy storage element 14 is depleted. Also, by using control connection 16, the local energy storage elements 14 of multiple window elements 2 could act together as a common energy storage element 14, i.e. energy source, thereby possibly sharing the stored energy of the energy storage elements 14 amongst the window elements 2. It is conceivable to group window elements 2 with regard to a combined or common energy storage element 14, so that e.g. only a sub-group of window elements 2 of an aircraft share their respective local energy storage elements 14. With regard to FIG. 4, e.g. window element 2a,b,c could share their respective local energy storage element 14 amongst each other with further window elements 2, not depicted in FIG. 4, not sharing.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A window element having a viewing area, comprising:
  a window shade element including an at least partially electrically darkable element, the window shade element movable between a first position and a second position;
  wherein, in the first position, the window shade element is covering a first portion of the viewing area, in the second position, the window shade element is covering a second portion of the viewing area and the electrically darkable element is at least partially removed from the viewing area, and the first portion and the second portion are unequal.

2. The window element according to claim 1, the window shade element further comprising:
  a photoelectric element configured to generate energy;
  wherein the generated energy is employed for at least partially operating the electrically darkable element.

3. The window element according to claim 2, further comprising:
  a control element for operating the window shade element;
  wherein the control element is arranged locally in the vicinity of or at the window element.

4. The window element according to claim 3,
  wherein the control element is selected from the group comprising a locally provided control element, a capacitive control element arranged on the window shade element, a control element arranged in the area surrounding the window element and a control element associated with at least one passenger seat arranged adjacent to the window element.

5. The window element according to claim 1, further comprising:
  an energy storage element, for storing energy for operating the electrically darkable element.

6. The window element according to claim 2,
  wherein the photoelectric element is configured to generate energy from light received from at least one of a first side and a second side of the window element.

7. The window element according to claim 1,
  wherein the window shade element is movable between the first position and the second position by at least one of a manual operation directly engaging the window shade element and an actuator element engaging the window shade element.

8. The window element according to claim 1,
  wherein at least one of the window shade element and the electrically darkable element are remotely controllable.

9. The window element according to claim 1,
  wherein the electrically darkable element is configured to be selectively darkable, and visual information is visualized on the electrically darkable element.

10. The window element according to claim 3, further comprising:
  a guiding element for accommodating the window shade element and for guiding the window shade element when being moved;
  wherein the window shade element is embodied as an integrated element comprising the electrically darkable element and at least one of the photoelectric element, and the control element .

11. The window element according to claim 1,
  wherein the window element is an aircraft window element for the passenger cabin of an aircraft.

12. The window element according to claim 1,
  wherein the electrically darkable element is an element selected from the group consisting of darkable glass, micro-mirror array element, electrochromic element, suspended particle element and e-ink element.

13. The window element according to claim 1, further comprising:

a sensor element for obtaining information about a light situation at the window element and for controlling the electrically darkable element based on the light situation.

14. A window system for a passenger cabin, comprising:
a window element having a viewing area, the window element comprising a window shade element including an at least partially electrically darkable element, the window shade element movable between a first position and a second position, and in the first position, the window shade element covers a first portion of the viewing area, in the second position, the window shade element covers a second portion of the viewing area and the electrically darkable element is at least partially removed from the viewing area, and the first portion and the second portion are unequal;
wherein the window shade element is manually movable between the first position and the second position, with at least one of the window shade element and the electrically darkable element controllable by a locally provided control element and at least one of the window shade element and the electrically darkable element are remotely controllable.

15. A vehicle, comprising:
a passenger cabin;
a window element in the passenger cabin, the window element having a viewing area and comprising a window shade element including an at least partially electrically darkable element, the window shade element movable between a first position and a second position, and in the first position, the window shade element covers a first portion of the viewing area, in the second position, the window shade element covers a second portion of the viewing area and the electrically darkable element is at least partially removed from the viewing area;
wherein at least one of the window shade element and the electrically darkable element are controllable by a locally provided control element and at least one of the window shade element and the electrically darkable element are remotely controllable.

16. The window element according to claim 2, wherein the photoelectric element is a photovoltaic element.

17. The window element according to claim 2, wherein the generated energy is employed for operating the electrically darkable element so that no further energy is required for operating the electrically darkable element.

18. The window element according to claim 3, wherein the control element controls the operation of the electrically darkable element.

19. The window element according to claim 3,
wherein the control element is an element selected from the group consisting of a capacitive control element, a capacitive sensing control element and a touch sensitive control element.

20. The window element according to claim 13, wherein the sensor element controls the electrically darkable element based on a difference in light received on a first side and a second side of the window element.

* * * * *